(No Model.)
H. R. ATWATER & F. G. SMITH.
UNIVERSAL JOINT.
No. 585,549. Patented June 29, 1897.
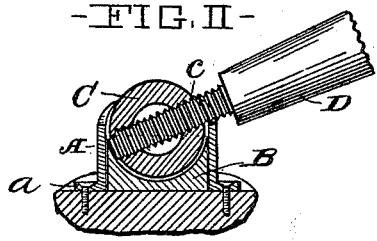
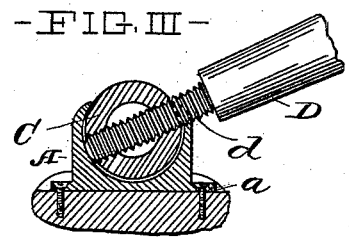
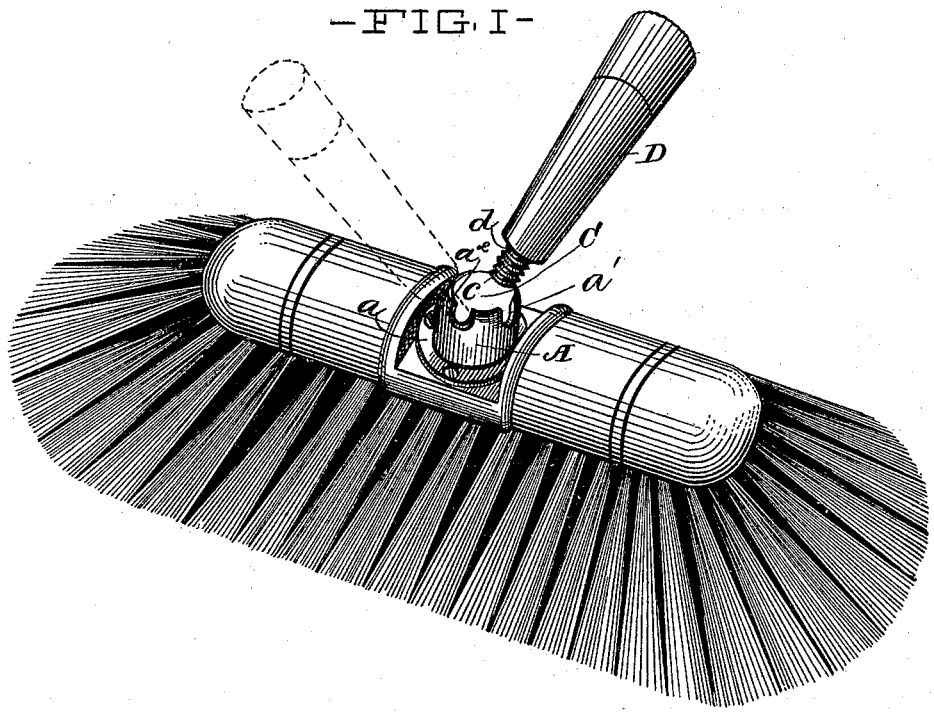
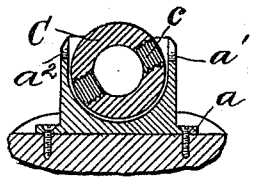
WITNESSES:
INVENTORS
H. R. Atwater and
F. G. Smith
BY Hall & Fay
ATTORNEYS

UNITED STATES PATENT OFFICE.

HARRY R. ATWATER AND FRANKLIN G. SMITH, OF CLEVELAND, OHIO.

UNIVERSAL JOINT.

SPECIFICATION forming part of Letters Patent No. 585,549, dated June 29, 1897.

Application filed October 12, 1896. Serial No. 608,544. (No model.)

*To all whom it may concern:*

Be it known that we, HARRY R. ATWATER and FRANKLIN G. SMITH, citizens of the United States, and residents of Cleveland, county of Cuyahoga, and State of Ohio, have invented certain new and useful Improvements in Universal Joints, of which the following is a specification, the principle of the invention being herein explained and the best mode in which we have contemplated applying that principle so as to distinguish it from other inventions.

The object of our invention is to provide a brush or other similar utensil with a handle having a joint which may be quickly and effectively shifted into different positions; and we accomplish this object by supplying the said handle with a ball-and-socket joint and so arranging the parts that by merely turning the handle in the ball any required fixed position thereof may be obtained.

The annexed drawings and the following description set forth in detail certain mechanism embodying the invention, such disclosed means constituting but one of various mechanical forms in which the principle of the invention may be used.

In said annexed drawings, Figure I represents a perspective of a brush embodying our invention, showing only so much of the handle as is necessary to fully illustrate the device. Fig. II represents a partial cross-sectional view thereof. Fig. III represents a cross-sectional view of a modification of our invention; and Fig. IV represents a cross-sectional detail view of the ball and socket of the modified form at a certain stage of the construction, which is hereinafter fully described.

The socket A of the joint is formed with a flange $a$, provided with screw-holes by means of which it may be fastened upon the brush or other article to which it is applied. A concave base-plate B of such diameter as to be easily admitted within said socket rests in the bottom thereof and against the surface to which said socket is attached.

The upper rim is formed with the indentations $a'$ substantially semicircular in outline. The projecting ears $a^2$ thus formed are inwardly bent in such a manner as to make the general contour of the upper inner portion of the socket spherical in shape, whereby it is adapted to form a bearing for ball C. The said ball is cast hollow, leaving sufficient metal, however, to form a screw-threaded bore $c$ for the reception of the threaded bolt $d$, attached to the end of the handle D. The end of said bolt $d$ is rounded off to conform to the concave surface of the base-plate B. The inside dimensions of the contour of the ball-socket as formed by socket A and base-plate B are such as to form, approximately, an attenuated sphere whose greatest diameter is greater than the diameter of the ball C, so that the ball may have a slight vertical movement, whereas the smallest diameter is such that the ball is permitted to have as little lateral play as is consistent with practicability. The ball lying loosely in the socket, the handle may be turned to any desired position and then dropped, so as to permit the depressions to engage the part of the screw-threaded portion of bolt $d$ near the handle proper. These depressions may of course vary in number and location, according to requirement or expediency. The handle now being turned around, so as to screw the bolt into the ball, the said bolt presses down upon the base-plate B and pushes the ball C upwardly against the curved ears $a^2$, forming the rim of the socket, whereby the said handle is firmly fixed in position.

In the modification of our invention the base-plate is cast integral with the socket, in which case the ears $a^2$ must be left straight until the ball has been introduced, after which they are bent as required. This arrangement makes a permanent structure which is very simple and cheap in its construction.

Other modes of applying the principle of our invention may be employed instead of the one explained, change being made as regards the mechanism herein disclosed, provided the means set forth in any one of the following claims be employed.

We therefore particularly point out and distinctly claim as our invention—

1. In a universal joint the combination of a ball, a socket and a handle extending through said ball adapted to cause said ball to have binding contact with said socket, substantially as set forth.

2. In a universal joint the combination of a ball, a socket and a handle, said socket provided with an independent removable base, said handle extending through said ball and adapted to bear against said base, whereby said ball is caused to have binding contact with said socket, substantially as set forth.

3. In a universal joint, the combination with a ball and socket, of a handle formed with a screw-threaded portion extending through said ball, the inner end of said screw-threaded portion adapted to engage the base of said socket, the outer portion of said screw-threaded portion adapted to rest in indentations formed upon the rim of said socket, whereby lateral movement of said handle is prevented, substantially as set forth.

In testimony that we claim the foregoing to be our invention we hereunto set our hands this 9th day of October, A. D. 1896.

HARRY R. ATWATER.
F. G. SMITH.

Witnesses:
A. E. MERKEL,
DAVID T. DAVIES.